United States Patent
Hopkins et al.

(10) Patent No.: US 7,588,488 B2
(45) Date of Patent: Sep. 15, 2009

(54) ELECTROLYZED WATER TREATMENT FOR POULTRY PRODUCTS

(75) Inventors: John Hopkins, Orem, UT (US); Douglas Wayne Kindred, Kennesaw, GA (US)

(73) Assignee: Electric Aquagenics Unlimited, Kennesaw, GA (US)

(*) Notice: Subject to any disclaimer, the term of this patent is extended or adjusted under 35 U.S.C. 154(b) by 231 days.

(21) Appl. No.: 11/396,672

(22) Filed: Apr. 3, 2006

(65) Prior Publication Data
US 2006/0260953 A1 Nov. 23, 2006

Related U.S. Application Data
(60) Provisional application No. 60/667,487, filed on Apr. 1, 2005.

(51) Int. Cl.
*A22C 21/00* (2006.01)
(52) U.S. Cl. .................. 452/173; 452/123
(58) Field of Classification Search .......... 452/123, 452/173
See application file for complete search history.

(56) References Cited

U.S. PATENT DOCUMENTS

| | | | | |
|---|---|---|---|---|
| 3,729,773 A | * | 5/1973 | Dillon | 426/524 |
| 4,667,370 A | * | 5/1987 | Brockington et al. | 426/524 |
| 4,862,557 A | * | 9/1989 | Clayton et al. | 99/534 |
| 5,605,503 A | * | 2/1997 | Martin | 452/173 |
| 5,632,676 A | * | 5/1997 | Kurschner et al. | 452/173 |
| 5,882,253 A | * | 3/1999 | Mostoller | 452/173 |
| 6,296,744 B1 | | 10/2001 | Djeiranishvili et al. | |
| 6,610,249 B1 | | 8/2003 | Hinze | |
| 6,632,347 B1 | | 10/2003 | Buckley et al. | |
| 6,835,126 B1 | | 12/2004 | Johnston et al. | |
| 6,964,787 B2 | | 11/2005 | Swart et al. | |
| 2002/0175085 A1 | | 11/2002 | Harkins et al. | |
| 2003/0098244 A1 | | 5/2003 | Ruhr et al. | |
| 2003/0146108 A1 | | 8/2003 | Nakamura et al. | |
| 2004/0151814 A1 | * | 8/2004 | Richardson et al. | 426/523 |
| 2004/0265445 A1 | | 12/2004 | Liimatta | |
| 2005/0058013 A1 | * | 3/2005 | Warf et al. | 366/98 |
| 2005/0126928 A1 | | 6/2005 | Hung et al. | |

FOREIGN PATENT DOCUMENTS

WO    WO2004/031337 A1    4/2004

OTHER PUBLICATIONS

Fabrizio et al, Comparison of Electrolyzed Oxidizing Water with Various Antimicrobial Interventions to Reduce Salmonella Species on Poultry; 2002 Poultry Science 81:1598-1605.

(Continued)

*Primary Examiner*—David J Parsley
(74) *Attorney, Agent, or Firm*—Bracewell & Giuliani LLP

(57) ABSTRACT

Processing poultry includes the application of electrolyzed water as one step during the processing process. Acidic and/or basic electrolyzed water can be applied to a poultry carcass during the processing process using a nozzle, an electrostatic sprayer or by immersion.

17 Claims, 1 Drawing Sheet

OTHER PUBLICATIONS

Park et al, Antimicrobial effect of electrolyzed water for inactivating Campylobacter jejuni during poultry washing, International Journal of Food Microbiology 2001.

Tagawa et al, Inactivation of a hepadnavirus by electrolysed acid water, Abstract, J. Antimicrob Chemother 2000.

Russell, The Effect of Electrolyzed Oxidative Water Applied Using Electrostatic Spraying on Pathogenic and Indicator Bacteria on the Surface of Eggs, 2003 Poultry Science 82:158-162.

Omahen, Electric Water Better at Killing Bacteria on Food, University of Georgia College of Agricultural and Environmental Sciences, Jul. 10, 2000.

Fabrizio et al, Stability of Electrolyzed Oxidizing Water and Its Efficacy against Cell Suspensions of *Samonella typhimurium* and *Listeria monocytogenes*, Journal of Food Protection, vol. 66, No. 8, 2003, pp. 1379-1384.

\* cited by examiner

ELECTROLYZED WATER TREATMENT FOR POULTRY PRODUCTS

CROSS-REFERENCE TO RELATED APPLICATION

This non-provisional patent application claims the benefit under § 119(e) of U.S. Provisional Patent Application Ser. No. 60/667,487, filed Apr. 1, 2005, which is incorporated herein by reference.

BACKGROUND OF THE INVENTION

1. Field of the Invention

This invention relates in general to poultry processing. More particularly, this invention relates to a system and method of processing poultry using electrolyzed water.

2. Background of the Invention

The Center for Disease Control (CDC) estimates that 76 million cases of food-borne illnesses occur each year, while food poisoning claims the lives of an estimated 5200 Americans. Most cases of food-borne illnesses are related to surface or product contamination, and up to one-third of the illnesses are related to improperly handled poultry and produce. With United States weekly chicken broiler production now exceeding 150 million birds per week, and with over 9 billion birds processed each year, a significant challenge for poultry processors is the control of illness-causing pathogens, including *Salmonella* and *E. coli*.

The current method of controlling illness-causing pathogens in poultry processing utilizes antimicrobial sprays and washes, followed by quenching in a chiller. The two antimicrobial agents most commonly used to disinfect poultry carcasses prior to the chiller are sodium hypochlorite and trisodium phosphate, while chlorine and chlorine dioxide gases are bubbled into chiller water in an attempt to kill pathogens there. These disinfectants are increasingly ineffective in preventing cross-contamination in vats and chillers during processing. They are also toxic to plant workers and the environment. Chlorine off gassing poses a threat to worker health. Trisodium phosphate contaminates wastewater with dangerous phosphates that cannot be removed.

The monetary cost associated with the current methods of poultry processing are just as high as the costs to workers and the environment. Large quantities of chemicals must be purchased and disposed of. For instance, each poultry processing facility in the United States uses up to 7,500 gallons of toxic chlorinated water every hour. Thus processing plants pay twice: first for the chemicals and then for expensive wastewater management solutions. The shortcomings and expense of the disinfectants currently used by poultry processors attest to a real need for effective cleaning and disinfecting alternatives.

Electrolyzed water is useful for disinfecting and cleaning. Electrolyzed water is produced by electrolysis. A feed water solution containing a saline solution component is supplied to an electrolytic cell comprising both an anode chamber and a cathode chamber. When normal culinary tap water is combined with an electrolyte (i.e., salt) and placed in contact with an electrical probe or plate, electrolysis occurs once the probe or plate is electrically charged by a power source. The probes or plates are separated by a membrane that separates and isolates certain chemical ions. During the chemical reaction, positively charged ions naturally migrate to the negative electrode (i.e., cathode) and negatively charged ions including precursors for hypochlorous acid (HOCl) naturally migrate towards the positive electrode (i.e., anode). The feed water solution is cathodically electrolyzed in the cathode chamber to produce electrolyzed water as an antioxidant solution called alkaline catholyte, commonly referred to as Type B water. The feed water solution is anodically electrolyzed in the anode chamber to produce electrolyzed water as an oxidant solution called anolyte, whose pH is modified in the process, and is commonly referred to as Type A water. The anolyte is a strong oxidizing solution. More specifically, acidic electrolyzed water is normally generated from the anode electrode through electrolysis of a dilute aqueous sodium chloride (NaCl) solution. The $Cl^{-1}$ ions are electrochemically oxidized to $Cl_2$ gas on the anode surface, which gas is partially hydrolyzed to hypochlorous acid (HOCl) in solution phase and to other ions.

The relatively high bactericidal activity of acidic electrolyzed water, or Type A water, is attributed to high oxidation-reduction potential (ORP), presence of dissolved $Cl_2$, $OCl^-$, and HOCl, and acidic pH. The high ORP of Type A water kills microbes by first damaging cell walls, thus allowing infiltration of the water solution inside the cell walls and causing an osmotic or hydration overload. The Type A water floods the cell faster than the cell can expel the fluid thus causing the cell to burst. Also contributing to the relatively high bactericidal activity is the presence of so-called active chlorine, which comprises dissolved $Cl_2$, $OCl^-$, and HOCl. The bactericidal activity of dissolved $Cl_2$ lessens over time as it evaporates or is otherwise lost from the Type A water during storage or a period of treatment. This loss may also affect other important properties of Type A water, such as its pH, ORP, and HOCl concentration. Finally, the low pH of Type A water effectively kills many pathogens.

SUMMARY OF THE INVENTION

The present invention relates to a system and method for processing poultry using electrolyzed water. Processing poultry with electrolyzed water overcomes many of the disadvantages of current poultry processing methods. Electrolyzed water is more pathogenically effective, safer for workers and the environment, and lower in cost.

The system and method of the present invention achieves an extremely high reduction in pathogen counts. It has been found that electrolyzed water is highly efficacious, achieving higher kill rates of harmful pathogens than alternative cleaners and disinfectants. In tests conducted at a major university and at an operating plant, electrolyzed water solutions achieved as high as a 6 log (99.9999%) reduction in *Salmonella* and *E. coli* on carcasses. Electrolyzed water is capable of killing bacteria, viruses, spores, and molds within seconds of contact. Furthermore, in contrast to other cleaners and disinfectants, pathogens are unlikely to become resistant to electrolyzed water over time.

Electrolyzed water also is capable of being produced on site without toxic chemicals. Only lab grade salt is added to the initial process as an electrolyte to assist in the electrolysis process. During the electrolysis process, a small amount of chlorine quickly gases off from the holding tank and dissipates into open atmosphere. The fluid is created in a room where venting can be accomplished without risk to operators, workers, or the environment.

Embodiments of the invention provide for a system for processing poultry comprising electrolyzed water and a plurality of application points for applying the electrolyzed water. Further embodiments of the invention provide for a system for processing poultry comprising an evisceration line, an inside/outside bird washer, and electrolyzed water. Embodiments of the invention also provide for a method of processing poultry comprising the step of applying electrolyzed water to a bird at a plurality of application points.

BRIEF DESCRIPTION OF THE DRAWINGS

Some of the features, advantages, and benefits of the present invention having been stated, others will become apparent as the description proceeds when taken in conjunction with the accompanying drawings in which.

DETAILED DESCRIPTION

Figure 1:
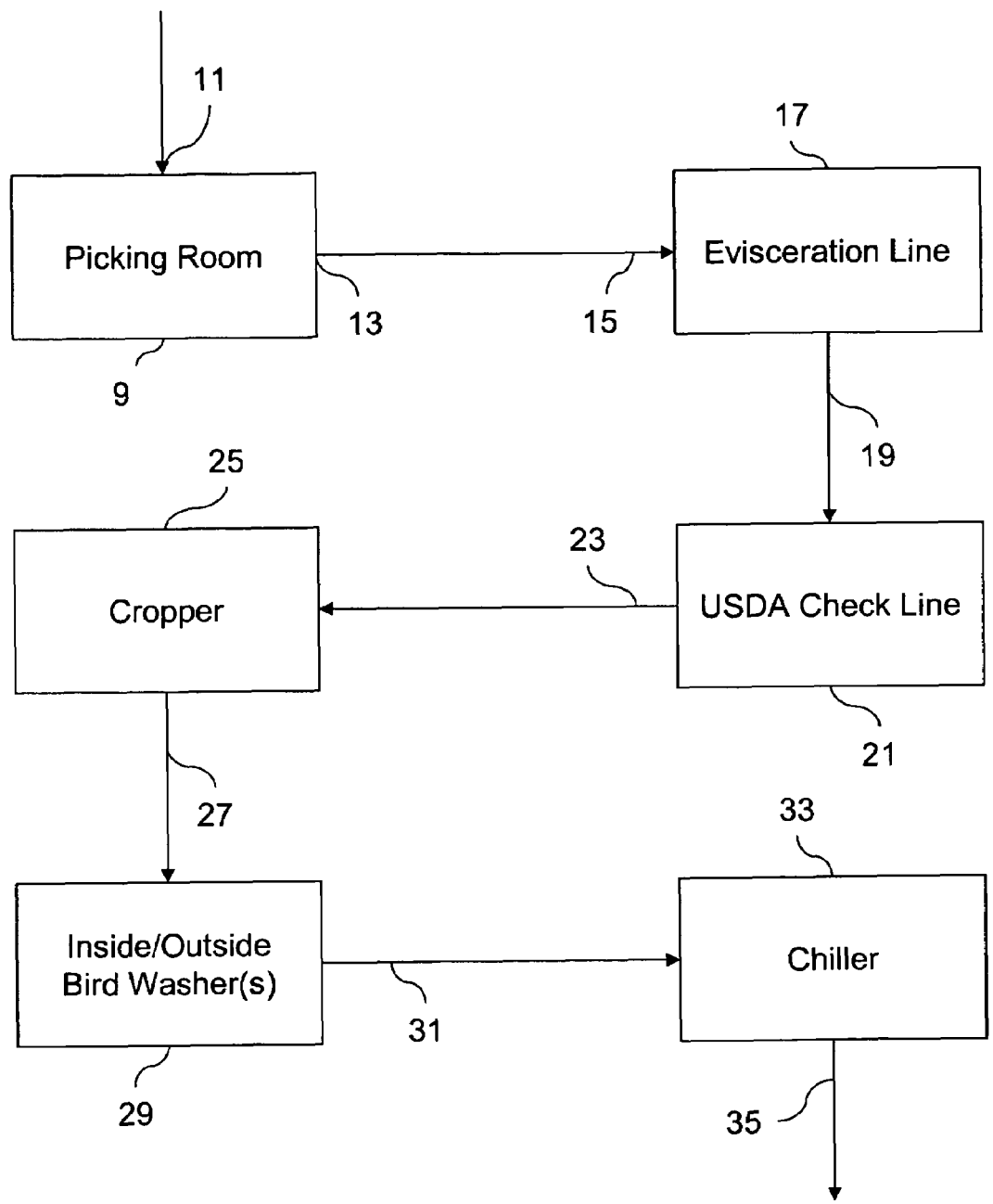
FIG. 1 is a schematic diagram of a system in accordance with an embodiment of the present invention.

Although the following detailed description contains many specific details for purposes of illustration, anyone of ordinary skill in the art will appreciate that many variations and alterations to the following details are within the scope of the invention. Accordingly, the exemplary embodiment of the invention described below is set forth without any loss of generality to, and without imposing limitations thereon, the claimed invention.

Types of Electrolyzed Water

Electrolyzed water produced by electrolysis is classified into three types: Type A, Type B, and Type C. In the preferred embodiments described below, electrolyzed water is produced from an electrolyte solution made by combining tap or other water with a concentration of about 1% to 50% sodium chloride. However, a concentration of 10% to 30% sodium chloride is more preferable. In certain embodiments a concentration of about 20% is preferred. Furthermore, it should be noted that electrolyte solutions for producing electrolyzed water may include magnesium chloride ($MgCl_2$), sodium phosphate ($NaH_2PO_4$), and amidosulfonic acid ($H_3NO_3S$). Some of these electrolyte solutions are described in U.S. Pat. No. 7,011,739, which is incorporated herein by reference.

Type A water is a disinfectant that kills a large variety of bacteria, viruses, molds, and spores within seconds of contact. It is capable of replacing chlorinated water, and can be more effective at killing pathogens without the toxicity. When negatively charged ions migrate to the anode, the fluid around the anode develops a reduced pH in the approximate range of 1.8 to 3.5 and an ORP in the approximate range of 1050 to $1400^+$ millivolts (mV). Type A water can be produced as a continuous stream of clear solution having a pH of 1.8-3.5, an ORP of 1,050-1,400$^+$ mV, and containing 8-200 parts per million (ppm) of HOCl. When Type A water comes in contact with organic material its pH increases, its ORP drops, and the HOCl dissipates or gases off, thus returning to ordinary water having a small amount of free chlorine (Cl). Safety and toxicity tests have shown that Type A water is nontoxic at an HOCl concentration ranging from 10 to 120 ppm, a pH of 1.8, and an ORP ranging from 1050-1400$^+$ mV.

Type B water is an extremely effective emulsifier and cleaner having antimicrobial properties. It is capable of saponifying surfaces upon contact. Type B water is an alkaline water stream and can be produced as a continuous stream of clear solution produced around the negative electrode, i.e., cathode, during electrolysis. Type B water is basic with a pH in the approximate range of 9.5 to 12.2. The ORP of Type B water is in the approximate range of 350$^-$-950$^-$ mV. Type B water also contains sodium hydroxide (NaOH) ions in the approximate range of 8 to 200 ppm. NaOH has the ability to saponify, or create a microscopic "soap" film on the surface of a target. Type B water is effective in emulsifying oils and lipids and leaves no residue. Safety and toxicity tests show that Type B water is nontoxic at a pH of 9.5 to 12.2 and an ORP from 350$^-$ to 950$^-$ mV.

Type C water is essentially a form of stabilized Type A water with a longer shelf life. Type C solution has an ORP in the approximate range of 850-1080$^+$ mV, a pH value in the approximate range of 3.6-7.0, and contains HOCl in the approximate range of 8-80 ppm.

Table 1 summarizes the typical physical characteristics of Type A, B, and C water produced from an electrolyte solution containing sodium chloride.

TABLE 1

Physical Characteristics of Type A, B, and C Water

| Type | pH | ORP (mV) | HOCl (ppm) | NaOH (ppm) |
|---|---|---|---|---|
| Type A | 1.8-3.5 | 1050-1400$^+$ | 8-200 | — |
| Type B | 9.5-12.2 | 350$^-$-950$^-$ | — | 8-200 |
| Type C | 3.6-7.0 | 850-1080$^+$ | 8-80 | — |

Effect of Electrolyzed Water

The examples that follow describe the effect of electrolyzed water against a variety of common pathogens found on poultry carcasses. Many variations on the specific perimeters of the examples are possible. Thus the examples are provided only for completeness, and not by way of limitation.

Example 1

Both Type A and B water were applied to poultry carcasses. Type B water was applied in a shower; Type B water was applied again in a spray cabinet; and finally Type A water was applied in a spray cabinet. The spray application was accomplished with a spray manifold having eight spray heads in a single manifold.

The application of Type B water in the shower and spray cabinet was identical except for location. The Type B water had a pH of 11.0, an ORP of 900$^-$ mV, and an initial NaOH concentration of 25 ppm. Type B water was sprayed from a spray nozzle onto the carcasses from multiple angles for approximately 1.5 seconds at 35 psi and 7 gpm at a temperature of 50° C. The temperature of the solution was greater than the fat temperature of the poultry carcasses before application. The spray washing with Type B water occurred immediately following de-feathering or de-flocking and saponified the surfaces of the carcasses so that any fecal matter or other substances would not adhere to the carcasses. Tests revealed no measurable discoloration, deterioration, or change in consistency or texture of the target tissue as a result of spraying with Type B water.

Within seconds after the second application of Type B water, the poultry was removed from the Type B spray cabinet and placed in the Type A spray cabinet for disinfecting. The Type A water had a pH of 2.5, an ORP of 1100$^+$ mV, and an initial HOCl concentration of 25 ppm. Type B water was sprayed from a spray nozzle onto the carcasses from multiple angles for approximately 1.5 seconds at 35 psi and 7 gpm at a temperature of 50° C. The temperature of the solution was greater than the fat temperature of the poultry carcasses before application.

Table 2 summarizes the effect of the protocol of Example 1 on *E. coli* on chicken carcasses. CFU/cm2 stands for colony forming units per square centimeter, as understood by those of skill in the art. Any reduction in colony forming units is as compared to the control.

TABLE 2

Effect of Electrolyzed Water by Spraying Against *E. coli* on Broiler Chicken Carcasses

| Treatment | Initial ($Log_{10}$ $CFU/cm^2$) | Reduction ($Log_{10}$ $CFU/cm^2$) |
| --- | --- | --- |
| Control - Spray with Tap Water | 2.12 | — |
| Spray with Type B, Spray with Type B, Spray with Type A | 1.67 | 0.45 |

Example 2

Both Type A and B water were applied to poultry carcasses. Type B water was applied by electrostatic spraying followed by Type A water by immersion.

Type B water was applied by electrostatic sprayer immediately after de-feathering or de-flocking the birds. The Type B water had a pH of 9.0-9.5, and an ORP of $850^-$ mV, and an initial NaOH concentration 8-10 ppm. The Type B water was electrostatically sprayed on the carcass for 17 seconds, followed by a 45 minute dwell period at 4° C. in a chiller.

After removal from the chiller, Type A water was immediately applied to the carcasses by immersion or dipping. The Type A water had a pH of 1.9-2.4, an ORP of $1150^+$ mV, and an initial HOCl concentration of 8-10 ppm. The poultry carcasses were dipped into the Type A water for 60 minutes at a temperature of 20° C. The carcasses were agitated or shaken while immersed, which agitation was accomplished through an aeration device positioned underneath the carcasses being treated.

Table 3 summarizes the effect of the protocol of Example 2 on *E. coli* on chicken carcasses. CFU/cm2 stands for colony forming units per square centimeter, as understood by those of skill in the art, and ESS stands for electrostatic spray. Any reduction or increase in colony forming units is as compared to the no treatment control.

TABLE 3

Effect of Electrolyzed Water by Electrostatic Spraying or Immersion Against *E. coli* on Broiler Chicken Carcasses

| Treatment | Initial ($Log_{10}$ $CFU/cm^2$) | Reduction ($Log_{10}$ $CFU/cm^2$) |
| --- | --- | --- |
| Control - No Treatment | 7.27 | — |
| Control - ESS with Tap Water | 7.51 | 0.24 increase |
| Control - Immersion with Tap Water | 7.07 | .20 |
| Control - ESS, Immersion, ESS with Tap Water | 7.06 | 0.21 |
| ESS with Type B | 7.62 | 0.35 increase |
| Immersion with Type A | 1.00 | 6.27 |

Example 3

Type A water was applied to poultry carcasses. The carcasses were de-feathered or de-flocked and placed in a chiller. The Type A water was applied immediately after removal from the chiller and had a pH of 2.5, an ORP of $1150^+$ mV, and an initial HOCl concentration of 50 ppm. The poultry carcasses were dipped into the Type A water for approximately 10 minutes at a temperature of 2° C. The carcasses were agitated or shaken while immersed, which agitation was accomplished through an aeration device positioned underneath the carcasses being treated.

Table 4 summarizes the effect of the protocol of Example 3 on *E. coli* on chicken carcasses. CFU/cm2 stands for colony forming units per square centimeter, as understood by those of skill in the art. Any reduction in colony forming units is as compared to the chiller control.

TABLE 4

Effect of Electrolyzed Water by Immersion Against *E. coli* on Broiler Chicken Carcasses

| Treatment | Initial ($Log_{10}$ $CFU/cm^2$) | Reduction ($Log_{10}$ $CFU/cm^2$) |
| --- | --- | --- |
| Control - Chiller | 2.47 | — |
| Control - Immersion with Tap Water | 2.39 | 0.08 |
| Immersion with Type A | 0.80 | 1.67 |

Table 5 summarizes the effect of the protocol of Example 3 on total coliform on chicken carcasses. CFU/cm2 stands for colony forming units per square centimeter, as understood by those of skill in the art. Any reduction in colony forming units is as compared to the chiller control.

TABLE 5

Effect of Electrolyzed Water by Immersion Against Total Coliform on Broiler Chicken Carcasses

| Treatment | Initial ($Log_{10}$ $CFU/cm^2$) | Reduction ($Log_{10}$ $CFU/cm^2$) |
| --- | --- | --- |
| Control - Chiller | 2.54 | — |
| Control - Immersion with Tap Water | 2.50 | 0.04 |
| Immersion with Type A | 0.71 | 1.83 |

Table 6 summarizes the effect of the protocol of Example 3 on *Salmonella* on chicken carcasses. Any reduction the percent of positive samples is as compared to the chiller control.

TABLE 6

Effect of Electrolyzed Water by Immersion Against *Salmonella* on Broiler Chicken Carcasses

| Treatment | Percent Positive | Percent Reduction |
| --- | --- | --- |
| Control - Chiller | 32.00% | — |
| Control - Immersion with Tap Water | 16.67% | 47.91% |
| Immersion with Type A | 8.89% | 72.22% |

Example 4

Type C water was applied to poultry carcasses. The carcasses were de-feathered or de-flocked and placed in a chiller. The Type C water was applied immediately after removal from the chiller. The Type C water had a pH of 2.5, an ORP of $1150^+$ mV, and an initial HOCl concentration of 50 ppm. The poultry carcasses were dipped into the Type C water for approximately 60 minutes at a temperature of 2° C. The carcasses were agitated or shaken while immersed, which agitation was accomplished through an aeration device positioned underneath the carcasses being treated.

Table 7 summarizes the effect of the protocol of Example 4 on *E. coli* on chicken carcasses. CFU/cm2 stands for colony forming units per square centimeter, as understood by those of skill in the art. Any reduction in colony forming units is as compared to the control.

TABLE 7

Effect of Electrolyzed Water by Immersion Against *E. coli* on Broiler Chicken Carcasses

| Treatment | Initial ($Log_{10}$ CFU/cm$^2$) | Reduction ($Log_{10}$ CFU/cm$^2$) |
|---|---|---|
| Control - Immersion with Tap Water | 1.29 | — |
| Immersion with Type C | 0.37 | 0.92 |

Use of Electrolyzed Water in Poultry Processing Plants

It has been discovered that different types of electrolyzed water are best applied at different points during poultry processing. Birds traveling through a plant undergo a series of processes are various points. Type B water contains sodium hydroxide and acts as a saponifying agent. Type B water works to remove organic material from the surface of the bird. It also makes the surface of the bird slippery, which helps to prevent organic material and bacteria from adhering to the carcass. Thus, Type B water is best applied where the birds are dirty, are about to undergo major trauma, or have recently undergone major trauma. Type A water contains hypochlorous acid and acts as a disinfecting agent. Type A water is best applied were the bird is relatively clean or where the dwell time of the solution on the bird is relatively long. Because organic material acts to deactivate Type A water, it preferably should not be applied at a point in the plant where the surface of bird has a relatively large amount of organic material thereon.

FIG. 1 is a schematic diagram of a poultry processing system using Type A and B water at appropriate points. As understood by those of skill in the art, a poultry processing plant can be arranged in any number of ways, the plant of FIG. 1 serving only as an example.

The birds enter the plant at picking room 9, where the birds preferably have their feathers and feet removed. The surfaces of the birds are dirty with organic matter upon entry to the plant and after de-feathering. Type B water may be applied by nozzles at point 11. This application may occur within picking room 9, before de-feathering, or before the birds enter the picking room. Type B water may also be applied by nozzles at point 13. This application may occur within picking room 9, after de-feathering, or after the birds leave the picking room. Type B water is again applied by nozzles at point 15. This application occurs before entering evisceration line 17, where the carcasses are cut and the guts removed. Evisceration results in both major trauma to the bird and possible fecal contamination. Type B water is applied by nozzles after evisceration line 17 at point 19. The birds next travel to USDA check line 21. Either Type A or Type B water may be applied by nozzles at point 23. The choice depends mostly upon the dwell time until the carcasses reach cropper 25. Cropper 25 removes the crops from the carcasses and, in so doing, inflicts major trauma on the birds. Type B water is applied by nozzles after cropper 25 at point 27. Next the birds enter one or more inside/outside bird washers (IOBW) 29. IOBW 29 washes the birds with Type A water by nozzles. The birds are again sprayed with Type A water by nozzles at point 31 before traveling to chiller 33. Chiller 33 could be chlorinated as in the prior art. More preferably, chiller 33 contains Type A water, in which the birds are immersed. Finally, after exiting chiller 33, the birds are sprayed again with Type A water by nozzles at point 35 before traveling to other areas of the plant. Electrolyzed water may of course be used in further processing of the birds, such as before packaging. Type B water preferably should be used where trauma and organic matter are encountered (for example skinning, deboning, and cutting into parts) and Type A water preferably would be used where a relatively long dwell time is encountered or the birds are relatively clean.

In the system of FIG. 1, electrolyzed water is preferably applied by nozzles at an approximate pressure of between 20-100 psi. More preferably, IOBW 29 operates at 70-100 psi, while the remaining nozzles operate at 20-40 psi. The volume of electrolyzed water preferably ranges from approximately 0.25 to 1.5 gpm per nozzle, but can vary significantly depending on the number of birds processed and the number of nozzles used. The nozzles of the system of FIG. 1 are preferably of the standard variety, but also may be electrostatic sprayers. Electrostatic sprayers break down the droplet size to about 30 microns in diameter, and add either a positive or negative charge to the surface of each droplet. The electrical charge of the spray can increase the volume of solution that adheres to the carcass, thereby increasing the effect.

The temperature of the electrolyzed water used in the system of FIG. 1 preferably ranges from approximately 2-60 degrees Centigrade. More preferably, electrolyzed water applied by the nozzles ranges from approximately 10-30 degrees Centigrade, while the electrolyzed water in the chiller ranges from approximately 2-10 degrees Centigrade. For purposes of choosing between Type A and B water, a dwell time of 40 seconds or more would militates towards the use of Type A. The system of FIG. 1 is preferably equipped with valves that permit the application of either Type A or B water at any application point, the valves permitting maximum flexibility in configuration of the system. Also within the scope of the system of FIG. 1 is the substitution of Type C water at one or more points where Type A water is specified.

In the drawings and specification, there have been disclosed typical preferred embodiments of the invention, and although specific terms are employed, the terms are used in a descriptive sense only and not for purposes of limitation. The invention has been described in considerable detail with specific reference to these illustrated embodiments. It will be apparent, however, that various modifications and changes can be made within the spirit and scope of the invention as described in the foregoing specification and as defined in the appended claims.

That claimed is:

1. A system for processing poultry comprising:
   a de-feathering station;
   an evisceration station;
   a cropping station;
   an inside/outside bird washing station;
   a chiller;
   a first electrolyzed water;
   a second electrolyzed water; and
   a plurality of application points for applying the first and second electrolyzed water;
   wherein the first electrolyzed water comprises an alkaline water stream having a pH between approximately 9.5 and 12.2, an oxidation reduction potential between approximately −350 mV and −950 mV and a NaOH concentration of between approximately 8 and 200 ppm; and
   wherein the second electrolyzed water is selected from a first acidic electrolyzed water comprising a pH between approximately 1.8 and 3.5, an oxidation reduction potential of between approximately +1050 mV and +1400 mV and a HOCl concentration of between approximately 8 and 200 ppm and a second acidic electrolyzed water comprising a pH between approximately 3.6 and 7.0, an oxidation reduction potential of between approximately +850 mV and +1050 mV and a HOCl concentration of between approximately 8 and 80 ppm.

2. The system of claim 1 wherein one or more of the plurality of application points is selected from the group consisting of (a) after de-feathering, (b) before evisceration, (c) after evisceration, (d) before cropping, (e) after cropping, (f) before chilling, (g) during chilling, and (h) after chilling.

3. The system of claim 1 wherein the electrolyzed water is applied to a bird that has undergone recent major trauma.

4. The system of claim 1 wherein a dwell time of the electrolyzed water on a bird is at least 40 seconds.

5. The system of claim 1 wherein the electrolyzed water is applied to a bird by a means selected from the group consisting of a nozzle, an electrostatic sprayer, and immersion.

6. The system of claim 1 wherein the application point for applying the second electrolyzed water is during or after either the inside/outside bird washing station or the chiller.

7. The system of claim 1 wherein the application point for applying the first electrolyzed water is during or after at least one of the stations selected from the group consisting of the de-feathering station, the evisceration station and the cropping station.

8. A method of processing poultry comprising the steps of:
introducing a bird to a poultry processing facility, said poultry processing facility comprising an evisceration line, a cropper, an inside/outside bird washer and a chiller;
producing a first electrolyzed water from an aqueous electrolyte solution comprising sodium chloride, said first electrolyzed water comprising a pH between 9.5 and 12.2, an oxidation reduction potential between approximately −350 mV and −950 mV and a NaOH concentration of between approximately 8 and 200 ppm;
producing a second electrolyzed water from an aqueous electrolyte solution comprising sodium chloride, said second electrolyzed water being selected from a first acidic water comprising a pH between approximately 1.8 and 3.5, an oxidation reduction potential of between approximately +1050 my and +1400 mV and a HOCl concentration of between approximately 8 and 200 ppm and a second acidic water comprising a pH between approximately 3.6 and 7.0, an oxidation reduction potential of between approximately +850 mV and +1050 mV and a HOCl concentration of between approximately 8 and 80 ppm; and
applying the first and second electrolyzed water to the bird at a plurality of application points.

9. The method of claim 8 wherein the bird has undergone recent major trauma.

10. The method of claim 8 wherein the bird is about to undergo major trauma.

11. The method of claim 8 wherein a dwell time of the electrolyzed water on the bird is 40 seconds or more.

12. The method of claim 8 wherein the electrolyzed first and second waters are applied to the bird by a means selected from the group consisting of a nozzle, an electrostatic sprayer, and immersion.

13. The method of claim 8 wherein the first electrolyzed water is applied before or after the evisceration line.

14. The method of claim 8 wherein the second electrolyzed water is applied before, during or after at least one of the inside/outside bird washer and the chiller.

15. The method of claim 8 further comprising applying the first electrolyzed water is applied during skinning of the bird.

16. The method of claim 8 further comprising applying the first electrolyzed water is applied during deboning of the bird.

17. The method of claim 8 further comprising applying the first electrolyzed water is applied during a step wherein the bird is cut into parts.

* * * * *